US009261587B1

(12) United States Patent
Gwinn, IV et al.

(10) Patent No.: US 9,261,587 B1
(45) Date of Patent: Feb. 16, 2016

(54) METHODS AND APPARATUS FOR HIGHLY RELIABLE SIGNAL DISTRIBUTION

(71) Applicant: Raytheon Company, Waltham, MA (US)

(72) Inventors: Joseph M. Gwinn, IV, Wellesley, MA (US); Jack J. Schuss, Newton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 445 days.

(21) Appl. No.: 13/833,554

(22) Filed: Mar. 15, 2013

(51) Int. Cl.
*G01S 7/40* (2006.01)
*G01S 13/00* (2006.01)

(52) U.S. Cl.
CPC ... *G01S 13/00* (2013.01); *G01S 7/40* (2013.01)

(58) Field of Classification Search
CPC .......... G01S 2013/0254; G01S 7/4017; H01Q 3/267; H01Q 3/38; H04B 3/46
USPC ................................................. 342/173–175
See application file for complete search history.

(56) References Cited

U.S. PATENT DOCUMENTS

| 3,750,178 A * | 7/1973 | Hulst ............................ 342/465 |
| 4,647,868 A * | 3/1987 | Mueller ........................ 330/286 |
| 4,649,393 A * | 3/1987 | Rittenbach .................... 342/371 |
| 4,760,397 A * | 7/1988 | Piccolruaz ...................... 342/75 |
| 5,671,168 A * | 9/1997 | Liu et al. ........................ 708/321 |
| 8,730,097 B1 * | 5/2014 | Uscinowicz .................. 342/173 |
| 2006/0006946 A1 * | 1/2006 | Burns et al. .................... 330/295 |

OTHER PUBLICATIONS

Nagurney, L., "A multi-emission frequency domain modulator," Vehicular Technology Conference, 1990 IEEE 40th , vol., no., pp. 71,74, May 6-9, 1990.*
Thian, M.; Fusco, V.; Buchanan, N.; Dielacher, F., "Integrated low-loss passive SiGe power splitter and combiner operating across 78-86 GHz band," Bipolar/BiCMOS Circuits and Technology Meeting (BCTM), 2013 IEEE , vol., no., pp. 85,88, Sep. 30, 2013-Oct. 3, 2013.*

* cited by examiner

*Primary Examiner* — John B Sotomayor
(74) *Attorney, Agent, or Firm* — Daly, Crowley Mofford & Durkee, LLP

(57) ABSTRACT

Methods and apparatus for providing a passive non-redundant signal distribution system including a passive combiner coupled to the first and second controlled signal sources to receive first and second signals, the combiner having an output, and a passive splitter coupled to the combiner output to provide reference signals to signal sinks, all to provide reliable dissemination of a reference signal despite failures of signal generation or distribution.

20 Claims, 5 Drawing Sheets

METHODS AND APPARATUS FOR HIGHLY RELIABLE SIGNAL DISTRIBUTION

STATEMENT REGARDING FEDERALLY SPONSORED RESEARCH

The subject matter of the present invention was made with government support under Contract No. FA8707-11-C-0004 awarded by the USAF. The government has certain rights in the invention.

BACKGROUND

As is known in the art, conventional high availability radar systems include at least two identical reference signal generation and distribution systems. Each component needing a reference signal receives a copy of the signal from each of the reference distribution systems to allow continued operation despite a failure in generating or distributing the reference signal. Components receiving the reference signal are called sinks herein.

FIG. 1 shows a prior art signal distribution system 100 having first and second identical signal sources 112a, b, each driving a respective one of first and second identical active splitters 114a, b. A first signal generation and distribution system comprises the first signal source 112a and the first active splitter 114a, and a second signal generation and distribution system comprises the second signal source 112b and the second active splitter 114b. Signal sinks 116a-N receive signals from both the first and second signal generation and distribution systems. As can be seen, the redundant signal distribution systems enable the sinks to receive a reference signal while meeting a required availability despite failures.

There are a number of disadvantages to this traditional approach. One disadvantage is the cost of duplicating distribution and reception systems. A technical disadvantage is that the two distribution systems necessarily differ in manufacturing tolerances and errors, requiring radar calibration for each system, thus increasing the amount of radar timeline occupancy required to calibrate the radar. Radar calibration refers to the continuous process whereby hardware imperfections are compensated for to enable the radar to generate sharp beams with low sidelobes and deep nulls, despite manufacturing variations and subsequent changes due to component aging, temperature variation, power supply voltage variation, and the like.

Another disadvantage is that prior-art signal distribution systems include active components, thus reducing reliability and increasing cost, complexity and sensitivity to temperature variations. Yet another disadvantage is that each and every component requiring a reference signal must be equipped to accept and choose between or combine at least two reference signals, thus at least doubling the expense and complexity of the component's signal reception interface.

There are alternate prior-art approaches where a single distribution system is driven by a pair of sources through a complicated redundant switching arrangement, but it can be difficult to find an adequate approach because the switches themselves are active and/or mechanical, and thus of limited reliability.

SUMMARY

The present invention provides method and apparatus for non-redundantly distributing a reference signal throughout a system, such as a radar system, to coordinate and align processing and signal generation. A precisely aligned and distributed reference signal is required for system performance. Exemplary embodiments of the invention provide efficient and non-redundant signal distribution while achieving relatively low probability of loss of the reference signal to meet stringent availability requirements.

In one aspect of the invention, a passive non-redundant signal distribution system comprises: a passive combiner coupled to the first and second controlled signal sources to receive first and second signals, the combiner having an output, and a passive splitter coupled to the combiner output to provide reference signals to signal sinks in the passive non-redundant signal distribution system.

The system can further include one or more of the following features: the combiner and the splitter are combined, a further splitter, wherein the splitter and the further splitter are merged into a hybrid coupler, a first controlled signal source generating the first signal and a second controlled signal source generating the second signal, the first controlled signal source includes a signal generator and a directional coupler coupled to a threshold detector, the first controlled signal source includes a signal switching module to selectively enable the first signal, the first controlled signal source includes a modulator to combine a sinusoidal signal with a further signal, the reference signals comprise one or more of one sine wave modulating another, a linear frequency modulation chirp, and/or a sinewave modulated with a binary sequence, and/or the first controlled signal source includes a signal adder to combine a sinusoidal signal with a further signal.

In another aspect of the invention a radar system includes: a receiver to receive a first signal and is generate a first output signal and a second output signal having a number of pulses per second, a modulator to combine the receiver first and second output signals and generate a modulator output signal, a directional coupler to provide a sample of the modulator output signal to a threshold detector, a passive combiner to receive the modulator output signal and generate a combiner output signal, and/or a passive first splitter to receive the combiner output signal and generate a number of reference signals for signal sinks for providing a passive non-redundant reference signal distribution system.

The radar system can further include one or more of the following features: a passive second splitter to split at least one of the reference signals from the first splitter, a passive non-redundant first signal distribution for a first part of a system and a passive non-redundant second signal distribution for a second part of the system, multiple antenna faces each having a passive non-redundant signal distribution system, and/or a first one of the signal sinks comprises a digital receiver/exciter.

In a further aspect of the invention, a method comprises: receiving first and second signals from respective first and second controlled sources, combining the first and second signals using a device to generate a third signal, splitting the third signal using a passive device to generate a number of reference signals for providing a passive non-redundant reference signal distribution system.

The method can further include one or more of the following features: receiving a first one of the reference signals at a radar transmit/receive system, receiving a first one of the reference signals at a DREX, enabling only a first one of the first and second signals, enabling and/or summing the first and second signals, and/or employing a further splitter, wherein the splitter and the further splitter are merged into a hybrid coupler.

BRIEF DESCRIPTION OF THE DRAWINGS

The foregoing features of this invention, as well as the invention itself, may be more fully understood from the following description of the drawings in which.

DETAILED DESCRIPTION

Exemplary embodiments of the invention provide a non-redundant passive signal distribution system that provides a relatively low overall failure rate that is useful in high availability systems. Exemplary signals include references for frequency, phase, time, local-oscillator, digital clock, and the like that can be used to coordinate and align various activities and signal generation processes. It will be appreciated that the degree to which coordination and alignment is achieved is a fundamental limit to radar system performance. In addition, loss of a reference signal can interrupt system operation. Exemplary embodiments of the invention provide a non-redundant signal distribution system that enables reliable operation, superior coordination, and cost effective implementation, despite failures of active devices.

Figure 1:
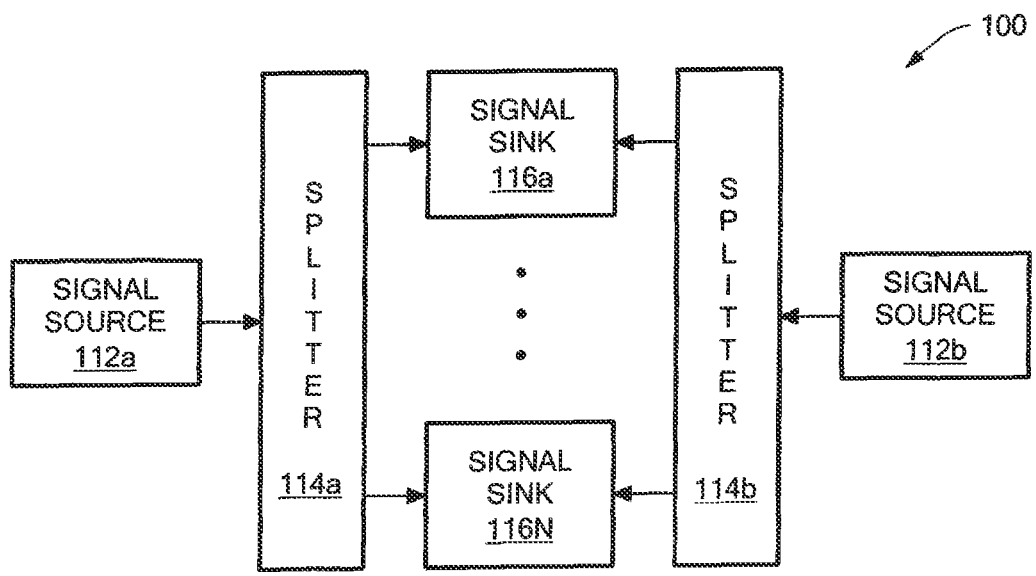
FIG. 1 is a block diagram of a prior art signal distribution system.
Figure 2:
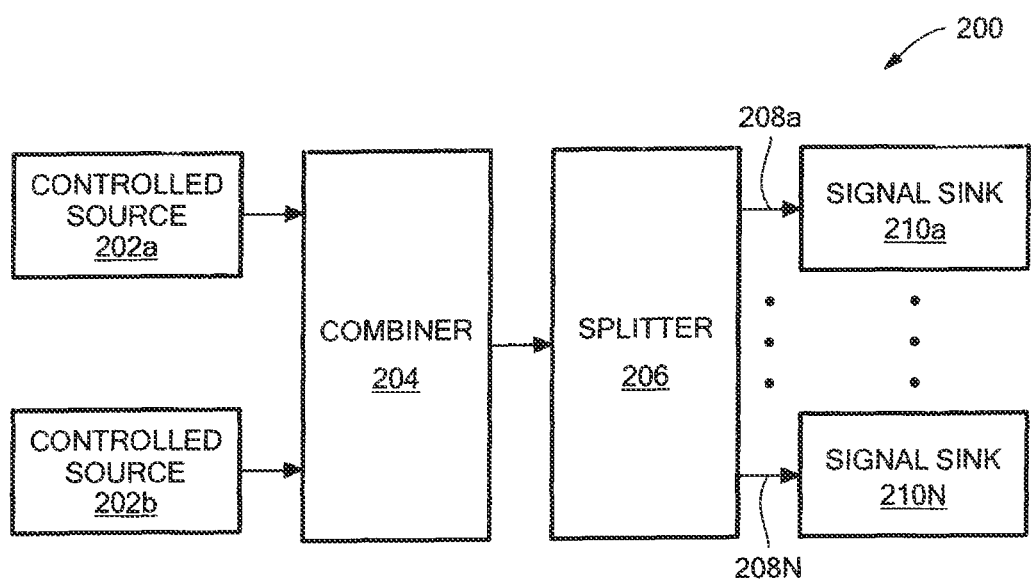
FIG. 2 is a block diagram of an exemplary non-redundant reference signal distribution system having passive signal combiner and splitter modules in accordance with exemplary embodiments of the invention.

FIG. 2 shows an exemplary non-redundant passive signal distribution system 200 having first and second controlled sources 202a,b, each driving a passive combiner 204. In one embodiment, the first and second controlled sources 202a,b are identical. The combiner 204 drives a passive splitter 206 that generates references signals 208a-N that can be connected to various signal sinks 210a-N, e.g., system components, circuit cards, etc., that use the reference signal. In one embodiment, a single combiner receives the signals from the controlled sources 202a,b, and drives a single splitter. It is understood that the combiner and splitter components can be merged into a single component.

As used herein, a passive device refers to a device that has no source of power save the signals it handles. By conservation of energy, the outputs of a passive device cannot in aggregate provide more power than the sum of the power levels of the input signals. In contrast, an amplifier always has an external source of power which is gated or controlled by its input signal or signals to yield a more powerful signal than that which is doing the gating or controlling.

Due to the multiple signal sinks 210, and the passive configuration of the combiner 204 and the splitter 206, the reference signal power as received at the signal sinks 210 will be less than the power emitted by the controlled sources 202a,b. But because passive devices can have relatively high, e.g., almost perfect, reliability, the probability of loss of the reference signals 208 at the signal sinks 210 can be made quite low, e.g., governed by the probability that all controlled sources 202 fail simultaneously.

As can be seen, either or both of the first and second controlled sources 202a,b can provide the reference signal. That is, the first and second controlled sources can be selectively enabled so that only one of the controlled sources is enabled at any given time. The resulting signal or signals are individually fed to the combiner 204. In an exemplary embodiment, the combiner 204 comprises a passive device that sums the incoming signals to provide a reference signal that is fed to the splitter 206. In an exemplary embodiment, the splitter 206 is a passive device that divides the incoming signal from the combiner 204 into as many copies as are needed to supply the various signal sinks 210a-N.

It is understood that while the illustrative embodiment shows the use of two controlled sources 202a,b for simplicity, any practical number of controlled sources may be used. It is further understood that the combiner and splitter may be implemented electrically or optically, and that signal transmission may be accomplished by means of electrical signals carried on transmission lines or by optical signals carried over optical fibers, or by some combination of the two. The combiner 204 may be implemented in various ways, including a passive combiner component, a hybrid coupler, or a combination of these kinds of components. It is also understood that the splitter and combiner, as well as other components, may be implemented as unitary components or as interconnected collections of unitary components.

Figure 3:
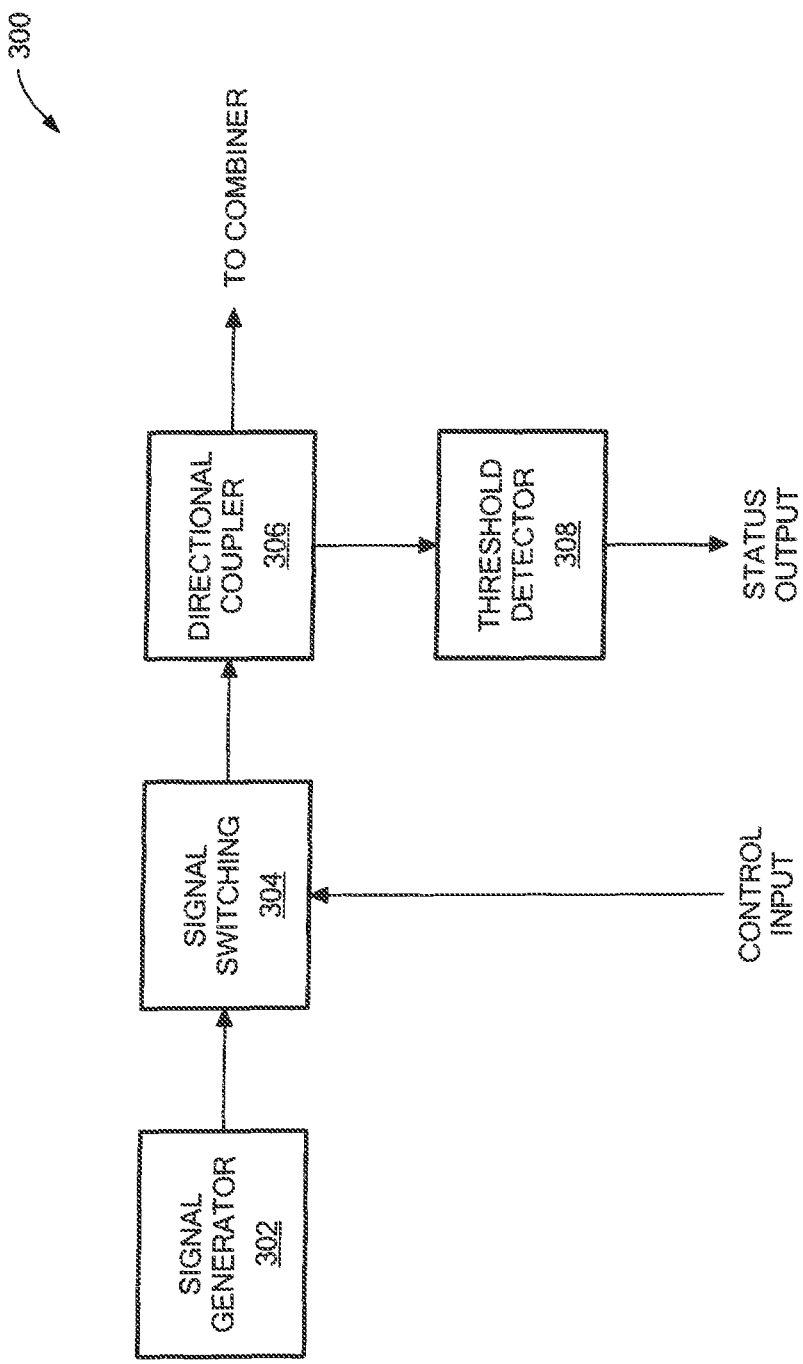
FIG. 3 is a block diagram of an exemplary controlled signal source.

FIG. 3 shows an exemplary implementation of a controlled source 300, such as the controlled source 202a of FIG. 2. A signal generator 302 generates a reference signal and feeds it to a signal switching module 304, which receives a control input signal, such as from a computer or subsystem, to enable or disable the reference signal output. The signal generator 302 output is fed to a signal sampling mechanism 306, such as a directional coupler 306, which extracts a representative sample of the outgoing signal and feeds the remaining signal to a combiner (not shown), such as the combiner 204 of FIG. 2. The representative sample is fed to a threshold detector 308, which reports status. The status output can indicate whether the representative sample meets a specified signal power level, and/or provide the actual measured signal level.

This allows the external control entity (not shown, but typically a computer or hardware controller or the like) to verify that its commands have in fact been followed, thus allowing detection and remedy of failures in the components of the controlled sources. In general, failures can be remedied by manual or automatic intervention to bypass failed components, followed by manual repair.

It is understood that directional coupler refers to any device that can detect signal energy propagating in a particular direction. In the illustrative embodiment of FIG. 4, the directional coupler 416 can detect that the power amplifier 414 is emitting a reference signal. It is understood that the directional coupler is not fooled by power backfeeding from other sources.

Figure 4:
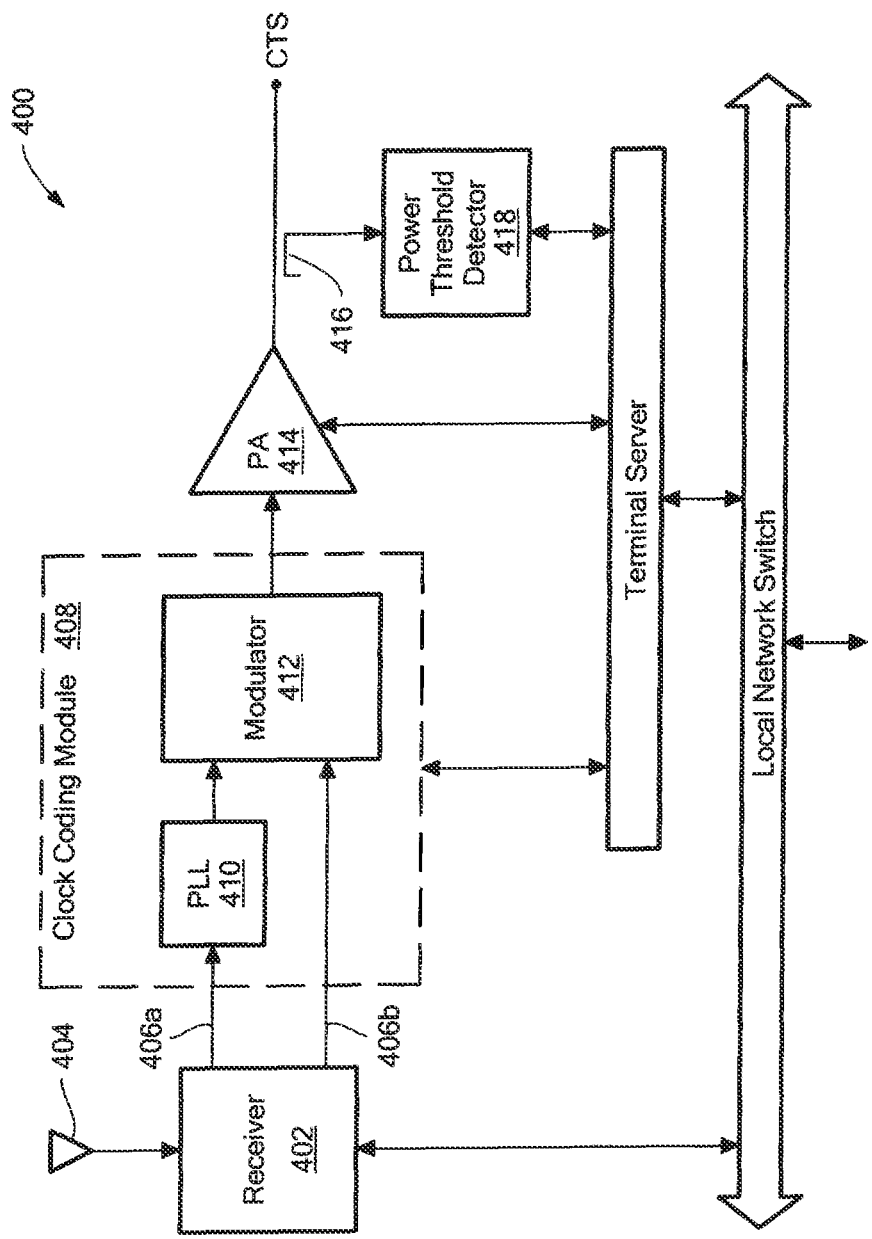
FIG. 4 is a schematic representation of an exemplary controlled signal source.

That is, looking at FIG. 4, the directional coupler 414 distinguishes between energy propagating outward (to the right) from energy propagating inward (to the left, flowing backwards into the output of the power amplifier 414).

It will be appreciated that combiners and splitters are relatively simple passive devices, and thus are of almost perfect reliability. By contrast, distribution amplifiers, and the like, are more complex and contain active devices such as RF amplifiers, and so have a significantly higher failure rate. It is further understood that a splitter can be used for combining and a combiner can be used for splitting: the difference is in intended use, not necessarily internal design. These are collectively called "reciprocal devices". Passive hybrid couplers and directional couplers are also reciprocal devices.

The signal switching module 304 has a control input that allows an external control entity (not shown) to enable and disable emission of the reference signal by the controlled source 300. It is understood that the signal generator 302 and signal switching module 304 may be merged into a single directly controlled signal source, if the signal source may be so controlled without undue degradation or variation of the generated signal when the output signal is enabled and disabled.

In this configuration, the external control entity commands one of the controlled sources to provide a reference signal and commands all other controlled sources to silence, and the one enabled controlled source provides the reference signal used by all the signal sinks. The external control entity receives reports from the threshold detectors of the controlled sources, and if the wrong number of controlled sources are reported to be providing a reference signal, the external control entity chooses a different controlled source to provide the reference signal.

It is understood that if the signal generators of the various controlled signal sources are synchronized and aligned such that summing their signals yields a valid and adequate reference signal, one may omit and/or bypass the signal switching module and/or the directional coupler, and allow the resulting reference signals to be summed in the combiner, the sinks utilizing the summed reference signal. In this embodiment, all sources 'sing' in chorus, and the song continues even if some sources fall silent, so long as there is at least one surviving source still singing.

FIG. 4 shows an exemplary implementation of a controlled source 400, such as the controlled source 102a of FIG. 2. A receiver 402, such as a GPS receiver, receives signals, such as GPS signals, using an antenna 404. The receiver 402 provides first and second output signals 406a,b to a clock coding module 408. In one embodiment, the first output 406a comprises a sinusoidal signal, e.g., a 10 MHz signal, and the second input 406b comprises a signal with one pulse per second to provide a time boundary. In this implementation, every ten millionth cycle of the 10 Wiz sinewave is tripled in amplitude, this larger cycle being referred to as a pip or mark. The one pulse per second signal is used by the modulator 412 to generate the pip on the sinewave seen at the output of 412, and in amplified form, at the output of power amplifier 414.

The first output 406a is provided to a phase-locked loop (PLL) 410, which has an output coupled to an amplitude modulator 412. A second input to the modulator 412 comprises the second output 406b (the pip signal) from the receiver 402. In one embodiment, the signals are combined for transmission in a single cable to maintain coherence between the signals. The modulator 412 output is provided to a power amplifier 414, which provides a signal that can be sampled using a directional coupler 416 for analysis by a threshold detector 418, as described above. The remaining signal is output as a Composite Timing Signal (CTS) to a combiner (not shown in FIG. 4).

While the illustrative embodiment utilizes amplitude modulation, it is understood that other types of modulation can be used, such as amplitude, phase, frequency, pulse, pulse amplitude, pulse width, pulse position, pulse code, polarization, propagation mode, combinations of modulation types, and so on. One may also simply sum the signals, versus using one signal to modulate another. In general, a reference signal, however composed or constructed, can be disseminated with very high availability, despite failures in active devices.

Figure 5:
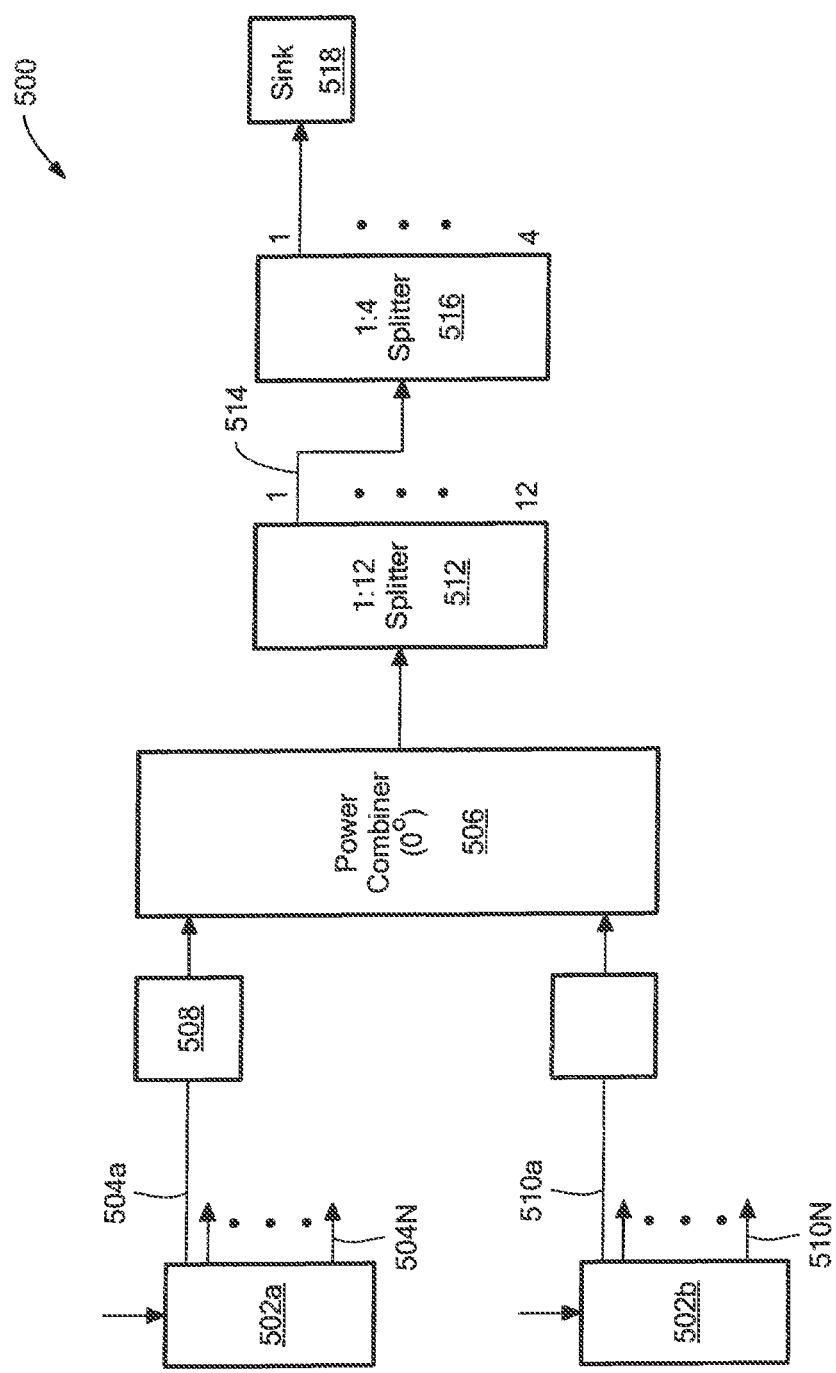
FIG. 5 is a schematic representation of an exemplary signal distribution system.

FIG. 5 shows an exemplary passive non-redundant distribution implementation 500 in accordance with exemplary embodiments of the invention. The illustrative system 500 comprises a passive signal distribution system for a radar system. A first system 502, which can be provided as a cabinet similar to that shown in FIG. 4 outputting a Composite Timing Signal (CTS), provides a number of timing signals 504a-N. A first one of the timing signals 504a is provided to a passive power combiner 506. In one embodiment, an attenuator 508 can adjust signal levels as needed. Similarly, a second system 502b also provides a tuning signal 510a to the power combiner 506.

It is understood that the term cabinet refers to a relatively arbitrary collection of components in close proximity to each other.

The combiner 506 output is received by a passive first splitter 512, shown in the illustrative embodiment as a 1:12 splitter. A first output 514 of the first splitter 512 is provided to a passive second splitter 516, shown in the illustrative embodiment as a 1:4 splitter. Outputs of the second splitter 516 are provided to various signal sinks 518, such as DREXs (digital receiver/exciters) in the radar system.

The illustrated embodiment is well suited for a radar system having multiple radar faces. The configuration of FIG. 5 can provide references signals to DREXs for a given radar face. Similar configurations can provide reference signals to the other radar. In such an arrangement, the five CTS signals 504a-e can be used to provide signals to the radar faces, each having a number of DREXs.

Figure 6:
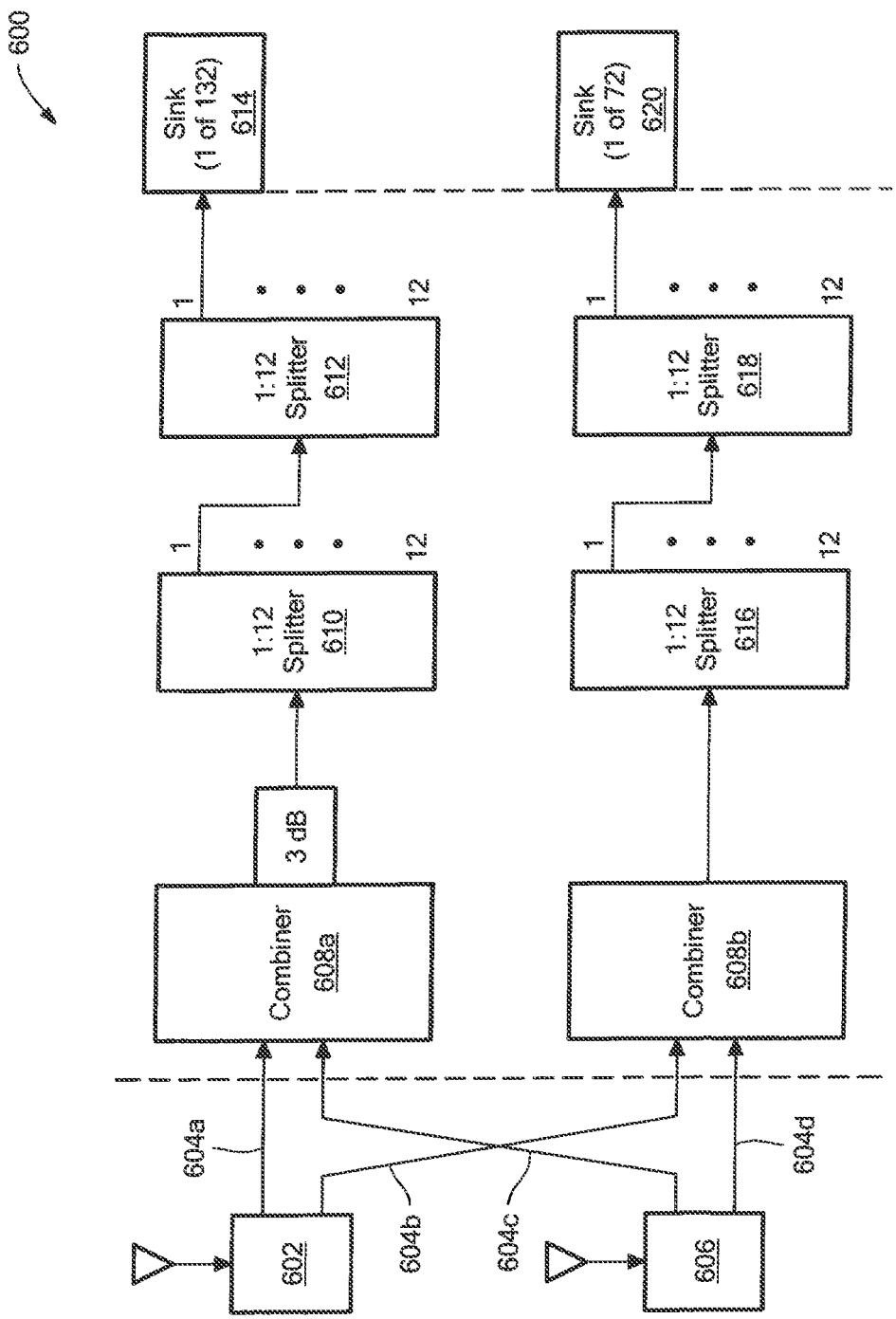
FIG. 6 is a schematic representation of a further exemplary signal distribution system.

FIG. 6 shows an exemplary passive non-redundant distribution implementation 600 in accordance with exemplary embodiments of the invention. A first system 602, which can comprise a cabinet, provides first and second signals 604a, b, which can comprise CTS signals shown in FIG. 4. A second system 606 provides third and fourth input signals 604c,d, which can also comprise CTS signals. In one embodiment, the CTS signals are selectively enabled.

The first input signal 604a is provided to a first combiner 608a and the second input signal 604b is provided to a second combiner 608b. Similarly, the third input signal 604c is provided to the first combiner 608a and the fourth input signal 604d is provided to the second combiner 608b. The first combiner 608a output is provided to a 1:12 first splitter 610 that feeds a 1:12 second splitter 612. Outputs from the second splitter 612 are provided to sinks 614 in the system, such as system cabinets. With this arrangement, any desired number of sinks, e.g., DREX cabinets, can acquire the reference signal.

The second combiner 608b feeds a 1:12 third splitter 616, which feeds a fourth splitter 618 supplying reference signals to sinks 620, such as DREX cabinets in different parts of the radar.

In one embodiment, the first and second combiners 608a,b may be merged into a single hybrid coupler. It is understood that the relevant property of a hybrid coupler is that power flowing into one of input flows out of both outputs, but very little of the input power flows from the other input, so there is little backflow of power from one source into the other. This holds true even if both sources are providing power to the hybrid combiner, so a hybrid coupler is useable for embodiments where only one source sings at a time, and also for those where all sources sing in chorus.

It is understood that any practical type and number of passive splitter can be used to meet the needs of a particular application. It is further understood that the number of reference signals, e.g., CTS signals, received by the combiner can be adjusted to meet the needs of a particular application.

In one exemplary embodiment, a two-way combiner is provided as Mini-Circuits Part No. ZFSC-2-4, a twelve-way splitter is provided as Mini-Circuits Part No, MC-12-1, and a four-way splitter is provided as Mini-Circuits Part No. ZFSC-4-1.

While certain exemplary embodiments of the invention are shown and described in conjunction with radar systems, it is understood that exemplary embodiments of a signal distribution system are applicable to systems in general in which it is desirable to provide high reliability distribution of a signal. In other embodiments, passive optical components are used to provide a non-redundant signal distribution system providing very high availability. Exemplary embodiments of the invention are useful in any system in which a number of signal sinks must be kept aligned by means of a reference signal, with high availability.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A passive non-redundant signal distribution system, comprising:
   a passive combiner configured to receive a first signal from a first controlled signal source and to receive a second signal from a second controlled signal source, the combiner having an output; and
   a passive splitter coupled to the passive combiner output to provide reference signals to signal sinks in the passive non-redundant signal distribution system.

2. The system according to claim 1, wherein the passive combiner and the passive splitter are combined.

3. The system according to claim 1, further including a further splitter, wherein the passive splitter and the further splitter are merged into a hybrid coupler.

4. The system according to claim 1, further including the first controlled signal source generating the first signal and the second controlled signal source generating the second signal.

5. The system according to claim 4, wherein the first controlled signal source includes a signal generator and a directional coupler coupled to a threshold detector.

6. The system according to claim 4, wherein the first controlled signal source includes a signal switching module to selectively enable the first signal.

7. The system according to claim 4, wherein the first controlled signal source includes a modulator to combine a sinusoidal signal with a further signal.

8. The system according to claim 4, wherein the reference signals comprise one or more of one sine wave modulating another, a linear frequency modulation chirp, and/or a sinewave modulated with a random binary sequence.

9. The system according to claim 4, wherein the first controlled signal source includes a signal adder to combine a sinusoidal signal with a further signal.

10. A radar system, comprising:
    a receiver to receive a first signal and generate a first output signal and a second output signal having a number of pulses per second;
    a modulator to combine the receiver first and second output signals and generate a modulator output signal;
    a directional coupler to provide a sample of the modulator output signal to a threshold detector;
    a passive combiner to receive the modulator output signal and generate a combiner output signal; and
    a passive first splitter to receive the combiner output signal and generate a number of reference signals for signal sinks for providing a passive non-redundant reference signal distribution system.

11. The radar system according to claim 10, further including a passive second splitter to split at least one of the reference signals from the passive first splitter.

12. The radar system according to claim 10, wherein the radar system includes a passive non-redundant first signal distribution for a first part of a system and a passive non-redundant second signal distribution for a second part of the system.

13. The radar system according to claim 10, wherein the radar system includes multiple antenna faces each having a passive non-redundant signal distribution system.

14. The radar system according to claim 10, wherein a first one of the signal sinks comprises a digital receiver/exciter.

15. A method, comprising:
    receiving first and second signals from respective first and second controlled sources;
    combining the first and second signals using a device to generate a third signal;
    splitting the third signal using a passive combiner to generate a number of reference signals for providing a passive non-redundant reference signal distribution system.

16. The method according to claim 15, further including receiving a first one of the reference signals at a radar transmit/receive system.

17. The method according to claim 15, further including receiving a first one of the reference signals at a DREX.

18. The method according to claim 15, further including enabling only a first one of the first and second signals.

19. The method according to claim 15, further including enabling and/or summing the first and second signals.

20. The method according to claim 15, further including employing a further splitter, wherein the splitter and the further splitter are merged into a hybrid coupler.

* * * * *